United States Patent [19]

Okamura et al.

[11] Patent Number: 5,098,610
[45] Date of Patent: Mar. 24, 1992

[54] CONDUCTIVE THERMOPLASTIC RESIN COMPOSITION

[75] Inventors: Michiya Okamura; Hiroshi Yui; Norio Matsuo; Shuji Hamano; Takeshi Hatakeyama, all of Yokkaichi, Japan

[73] Assignee: Mitsubishi Petrochemical Co., Ltd., Tokyo, Japan

[21] Appl. No.: 604,246

[22] Filed: Oct. 29, 1990

[30] Foreign Application Priority Data

Nov. 13, 1989 [JP] Japan ................................. 1-292380

[51] Int. Cl.$^5$ ............................................. H01B 1/06
[52] U.S. Cl. ..................................... 252/511; 252/502; 252/506; 524/495; 524/496
[58] Field of Search ............... 252/506, 511, 502; 524/495, 496, 236, 249, 599, 611

[56] References Cited

U.S. PATENT DOCUMENTS

| | | | |
|---|---|---|---|
| 4,471,015 | 9/1984 | Ebneth et al. | 252/511 |
| 4,474,685 | 10/1984 | Annis | 252/506 |
| 4,528,213 | 7/1985 | Nelson et al. | 524/496 |
| 4,566,990 | 1/1986 | Liu et al. | 252/503 |
| 4,702,859 | 10/1987 | Shimizu et al. | 252/511 |
| 4,728,691 | 3/1988 | Rosenquist | 252/511 |
| 4,783,279 | 11/1988 | Petermann et al. | 252/511 |
| 4,826,631 | 5/1989 | Sullivan | 252/506 |
| 4,909,960 | 3/1990 | Watanabe et al. | 252/511 |
| 4,929,388 | 5/1990 | Wessling | 252/511 |
| 4,971,726 | 11/1990 | Maeno et al. | 252/511 |

*Primary Examiner*—Josephine Barr
*Attorney, Agent, or Firm*—Oblon, Spivak, McClelland, Maier & Neustadt

[57] ABSTRACT

There is disclosed a conductive thermoplastic resin composition which comprises:
(a) 30 to 86% by weight of a thermoplastic aromatic polycarbonate,
(b) 2 to 15% by weight of a high density polyethylene having a density of 0.945 to 0.970 g/cm$^3$ and a melt flow rate of 0.1 to 30 g/10 min,
(c) 5 to 20% by weight of a glass fiber having an average diameter of 3 to 15 μm and an average length of 0.05 to 10 mm,
(d) 5 to 20% by weight of a carbon fiber having an average diameter of 3 to 20 μm and an average length of 0.03 to 15 mm, and
(e) 2 to 15% by weight of a conductive carbon black.

11 Claims, 1 Drawing Sheet

Longitudinal-direction

CONDUCTIVE THERMOPLASTIC RESIN COMPOSITION

BACKGROUND OF THE INVENTION

This invention relates to a resin composition having conductivity and dimensional accuracy which are suitable for precision electronic parts, and which is excellent in stability of these properties against change in circumferential temperature, oil resistance and mechanical characteristics.

In a base to which parts of electronics or image equipments for domestic electrical equipments are attached, lightening, thinning and variation of applications have rapidly progressed.

For example, to a base to which image parts (such as peripheral parts for magnetic tape running) are incorporated are required conductivity for noise reduction as well as dimensional accuracy and its stability, tough mechanical characteristics and oil resistance.

Heretofore, as a material for such fields, an aluminum alloy has been generally employed.

However, the aluminum alloy has defects that it is heavy and poor in productivity, and expensive in cost since various fabrications are required.

Therefore, in a market, a thermoplastic resin which is light and excellent in productivity, and cheap in cost is highly appreciated.

However, in a composite material wherein the conventional thermoplastic resin has been improved, the above various required characteristics cannot be satisfied so that it is difficult to replace a metal part with the conventional thermoplastic resin. For example, a polybutylene terephthalate is poor in oil resistance so that it cannot be used practically.

SUMMARY OF THE INVENTION

An object of the present invention is to provide a resin composition which is removed the above problems.

The present inventors have studied intensively by formulating various additives to a thermoplastic aromatic polycarbonate, and as the results, they have found that the above object can be accomplished by formulating a specific component, whereby established the present invention.

That is, a conductive thermoplastic resin composition of the present invention comprises the following each Component (a) to (e).

(a) 30 to 86% by weight of a thermoplastic aromatic polycarbonate,
(b) 2 to 15% by weight of a high density polyethylene having a density of 0.945 to 0.970 g/cm$^3$ and a melt flow rate of 0.1 to 30 g/10 min,
(c) 5 to 20% by weight of a glass fiber having an average diameter of 3 to 15 $\mu$m and an average length of 0.05 to 10 mm,
(d) 5 to 20% by weight of a carbon fiber having an average diameter of 3 to 20 $\mu$m and an average length of 0.03 to 15 mm, and
(e) 2 to 15% by weight of a conductive carbon black.

DESCRIPTION OF THE PREFERRED EMBODIMENTS

Figure 1:
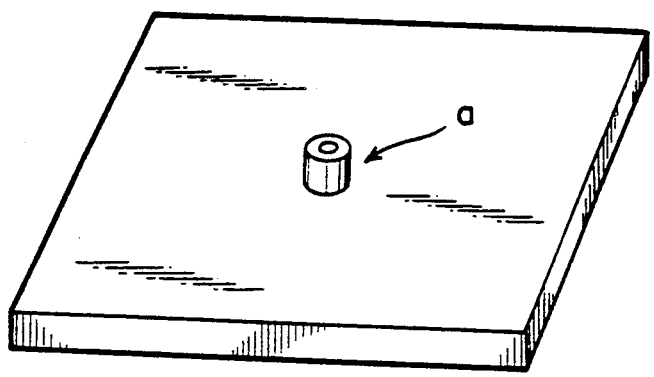
FIG. 1 is a perspective view of a test piece for evaluation of oil resistance.

The thermoplastic aromatic resin of the above Component (a) to be used in the present invention is those comprising at least parts of dihydroxy compounds constituting carboxylic acid ester have two phenolic hydroxyl group, or a modified material thereof. Examples of such a divalent phenol may specifically include a bisphenol compounds, especially bisphenol A.

The aromatic polycarbonate can be produced by reacting the above divalent phenol with a carbonate precursor such as phosgene, bischloroformate and carboxylic acid diester, but it may be obtained by selecting a suitable one from commercial products.

As the modified materials, a polycarbonate modified by the method in which an acrylonitrile-butadiene-styrene terpolymer is blended in a polycarbonate, or a styrene monomer is impregnated in pellets of a polycarbonate and then polymerizing the monomer.

The high density polyethylene of the above Component (b) to be used in the present invention is a high density polyethylene having a density of 0.945 to 0.970 g/cm$^3$ and particularly those having a density of 0.950 g/cm$^3$ or higher is preferred. If the density is out of the above range, good conductivity cannot be obtained.

Also, a melt flow rate (MFR) which is an index of flowability of the polyethylene should be 0.1 to 30 g/10 min measured under the conditions of 190° C. and a load of 2.16 kg, and preferably 0.5 to 15 g/10 min.

If the MFR is less than the above range, conductivity of the resin composition becomes poor, while it is too high, appearance becomes bad.

The glass fiber of the above Component (c) to be used in the present invention can be applied to those having an average diameter of 3 to 15 $\mu$m, preferably 5 to 12 $\mu$m and an average length of 0.05 to 10 mm, preferably 0.1 to 6 mm.

If the average diameter is out of the above range, mechanical strength of the resin composition becomes insufficient, while the average length is out of the above range, dimensional accuracy becomes insufficient.

Length of the above glass fiber becomes slightly short in a molded product applied for injection molding and glass fibers having an average length of 0.05 to 10 mm are dispersed so that the effect of the present invention can be revealed most effectively.

The glass fiber (c) may contain a surface treating component in order to improve adhesiveness with or affinity to the thermoplastic aromatic polycarbonate (a), and an attached amount may be generally 0.01 to 0.6% by weight based on the total weight of the glass fiber (c).

This glass fiber may be optionally selected from commercial products, but when it is produced, it can be carried out by, for example, softening marble (glass beads with predetermined size) under heating in a pushing (string collecting furnace), flowing down the melted glass (raw material) from a number of nozzles of said furnace table, while elongating the raw material with high speed, adhering greige goods by dipping with a greige goods device, bundling, drying and wounding with a rotary drum. By selecting a dimension of nozzle size and elongating conditions at this time, average diameter of the glass fiber can be determined.

Also, a shape of said glass fiber may be either roving, chopped strand or strand, or it may be so-called milled fiber or glass powder which are crushed product of the strand, but in view of mixing workability with a resin, chopped strand is preferred. Composition of a starting glass is preferably no alkali, and one of examples thereof may include E glass.

As the carbon fiber of the above Component (d) to be used in the present invention, usual chopped carbon fiber may be used, but high mechanical characteristics and dimensional characteristics are required as in the composition of the present invention, those prepared by the PAN (polyacrylonitrile) method is preferred.

An average diameter of the fiber is 3 to 20 μm, preferably 3 to 10 μm, and an average length is 0.03 to 15 mm, preferably 0.5 to 10 mm. If it is out of the above range, mechanical strength and dimensional accuracy of the resin composition are deteriorated so that they are not preferred.

Also, those having a carbon content of 95% or more are preferred. By using such carbon fibers, for example, in a molded product after applying to injection molding, an average length becomes slightly short and the carbon fiber is dispersed with a length of 0.03 to 15 mm, preferably 0.03 to 5 mm so that a balance of properties such as mechanical characteristics and dimensional characteristics becomes good.

This fiber may contain a surface treating component in order to improve adhesiveness with or affinity to the thermoplastic aromatic polycarbonate (a), and an attached amount may be generally 2 to 8% by weight based on the total weight of the carbon fiber (d).

Further, the conductive carbon black of the above Component (e) to be used in the present invention is suitably employed those such as acetylene black and Oil Furnace Black which are high conductivity as well as thermal black or channel black which are low conductivity but sufficient conductivity can be obtained by using a sufficiently large amount.

This carbon black is desirable to provide a required conductivity to the composition with addition of a small amount so that acetylene black and Oil Furnace Black, particularly Oil Furnace Black is preferred since impurities are little and conductivity is excellent. Of these, XCF (Extra Conductive Furnace Black), SCF (Super Conductive Furnace Black), CF (Conductive Furnace Black) and SAF (Super Abrasion Furnace Black) are particularly preferably used. Among these, those having a BET type specific surface area due to $N_2$ adsorption of 850 $m^2/g$ or more, particularly preferably 900 $m^2/g$ or more. As the XCF, there may be mentioned "Ketchen Black EC" (trade name) produced by Ketchen Black International Co. and "Balkan XC-72" (trade name) produced by Cabot Co., and as the SCF, there may be mentioned "Balkan SC" (trade name) and "Balkan P" (trade name) both produced by Cabot Co. and "Corlax L" (trade name) produced by Degusa Co. As the CF, there may be mentioned "Balkan C" (trade name) produced by Cabot Co. and "Conductex SC" (trade name) produced by Columbia Co., and as the SAF, there may be mentioned "Asahi #9" (trade name) produced by Asahi Carbon Co., "Diablack A" (trade name) produced by Mitsubishi Kasei Corporation and "Balkan 9" (trade name) produced by Cabot Co. These may be used in combination.

When the polycarbonate and the high density polyethylene are mixed with each other, delamination (layer state peeling off phenomenon) generally occurs due to lack of compatibility. However, when high conductivity Oil Furnace is mixed therewith, they are extremely well mixed with each other without causing any delamination since the Oil Furnace is rich in graphite structure at the surface thereof and the graphite structure at the surface of the specific carbon black shows specific affinity to crystallite structure of the high density polyethylene to show compatibility with each other, whereby the effects of the present invention can be further accomplished.

The formulation amounts of these indispensable components are as follows.

(a) polycarbonate: 30 to 86% by weight, preferably 35 to 70% by weight,
(b) high density polyethylene: 2 to 15% by weight, preferably 2 to 10% by weight,
(c) glass fiber: 5 to 20% by weight, preferably 5 to 15% by weight,
(d) carbon fiber: 5 to 20% by weight, preferably 5 to 15% by weight, and
(e) conductive carbon black: 2 to 15% by weight, preferably 2 to 10% by weight.

If the amount of the polycarbonate (a) is out of the above range, the composition does not reveal the effects of the present invention. If the amount of the high density polyethylene (b) is too small, conductivity, oil resistance and impact resistance of the composition are poor, while it is too much, bending strength and impact resistance of the same become poor. If the amount of the glass fiber (c) is too small, bending strength and dimensional stability of the composition become poor, while it is too much, moldability and conductivity of the same become poor. If the amount of the carbon fiber (d) is too small, in addition to impact resistance and bending strength, conductivity and dimensional stability of the composition become bad, while it is too much, moldability of the same is inferior. If the amount of the conductive carbon black (e) is too small, conductivity of the composition becomes poor, while it is too much, impact resistance becomes inferior.

In the composition of the present invention, additional components other than the above components may be formulated so long as not impairing the effects of the present invention remarkably.

As such additional components, there may be mentioned a moldability improver such as melamine.cyanuric acid adducts mentioned hereinbelow in detail; a filler such as calcium carbonate (heavy, light or glue), talc, mica, silica, alumina, aluminum hydroxide, magnesium hydroxide, barium sulfate, zinc oxide, zeolite, wollastonite, diatomaceous earth, glass beads, bentonite, montmorillonite, asbestos, hollow glass beads, graphite, molybdenum disulfide, titanium oxide, aluminum fiber, stainless steel fiber, brass fiber, aluminum powder, wood powder and rice full; a diluent or modifier comprising a thermoplastic resin and a rubber, or a latex thereof such as polypropylene, polyethylene other than the above indispensable component (b), polyamide, polyethylene terephthalate, polybutylene terephthalate, propylene-ethylene block copolymer or random copolymer, maleic anhydride-modified polyolefin, ethylenepropylene copolymer rubber, styrene-butadiene rubber, styrene-buradiene-styrene block copolymer or its hydrogenated derivative, polybutadiene and polyisobutylene; a modifier comprising a thermosetting resin such as epoxy resin, melamine resin, phenol resin and unsaturated polyester resin; antioxidant (phenol type, sulfur type, phosphor type and amine type), lubricant, colorant comprising an organic or inorganic pigment, UV absorber, antistatic agent, dispersant, neutralizer, foaming agent, plasticizer, copper-damage preventive, flame retardant and cross-linking agent.

Addition of these additive components is effective for improvement in physical property balance, surface properties of a molded product (anti-marring property, gloss, weld appearance, silver streak and flow mark), printing property, coatability, adhesiveness, plating property, moldability and durability.

It is particularly preferred to add 0.01 to 5 parts, more preferably 0.1 to 3 parts by weight of a melamine·cyanuric acid adduct having an average particle size of 0.1 to 50 μm to total 100 parts by weight of the above inevitable components (a) to (e), since the resulting composition is remarkably improved in moldability in addition to the effects of the present invention.

The melamine·cyanuric acid adduct is a melamine.-cyanuric acid adduct which can be obtained by, for example, reacting melamine and cyanuric acid or isocyanuric acid in an aqueous medium. A surface treated melamine·cyanuric acid adduct is particularly preferred, which can be obtained by using a substantially uniform solution comprising an organic solvent and a surface treating agent for melamine·cyanuric acid adduct dissolved therein is used as the aqueous medium. Such a producing method has been proposed in, for example, Japanese Patent Application No. 260849/1989.

The kind of the surface treating agent is largely depend on resin component(s) to which the melamine-cyanuric acid adduct is formulated. As the surface treating agent, a polymer which is similar to the resin components to which the melamine·cyanuric acid adduct is formulated is generally suitable, but it is not necessarily limited only to those which are similar to the resin components to be formulated, so long as it has good compatibility with the surface treated melamine.cyanuric acid adduct and the resin to be formulated therein and is capable of being dispersed uniformly. In the composition of the present invention, a melamine·cyanuric acid adduct surface treated with a polycarbonate is particularly preferred.

A concentration of the surface treating agent in the organic solvent is not particularly limited so long as it is capable of dissolving and forming a thin and uniform film (a thickness of 0.001 to 0.5 μm or so) of the surface treating agent on the surface of melamine·cyanuric acid adduct, but preferably 1 to 50% by weight based on the organic solvent.

The above reaction can be carried out generally at normal pressure. A reaction temperature may vary depending on the kinds of the solvent, but at the normal temperature, a reaction rate is slow so that a boiling point of the solvent is most preferred.

A reaction time may also vary depending on the reaction temperature, and for example, it is 2 hours or so when the reaction temperature is 50° to 60° C. and one hour or so when the reaction temperature is 80° to 90° C.

An average particle size of such a melamine·cyanuric acid adduct is 0.1 to 50 μm, preferably 0.5 to 30 μm. If the average particle size is less than the above range, it can be difficultly dispersed in the resin, while it exceeds the above range, improved effect in dimensional accuracy is small.

The composition of the present invention can be produced by using an usual kneading machine such as a single-screw extruder, a twin-screw extruder, a Banbury mixer, a roller, a Brabender Plastgraph and a kneader.

These components are generally applied to fabrication after making pellet-shaped compounds by kneading the above inevitable components and if necessary additional components by an extruder, but in a special case, molding may be carried out by directly supplying each component to a molding machine and kneading the composition by the same. Also, it may be also carried out by making a master batch by kneading previously Components (b) to (e) with high concentration, and diluting it with other components such as Component (a) to effect blend compounding, or directly molding.

The composition of the present invention can be molded by an usual molding machine for a thermoplastic resin. That is, it can be applied to injection molding, extrusion molding, hollow molding and thermoforming.

The composition of the present invention thus obtained comprises not existing a dispersed domain of the high density polyethylene with an independent particle state in the aromatic polycarbonate (a) as the matrix, but forming continuous circuits with a network structure. In such circuits, a larger part or substantially whole amounts of carbon black is included, which would be a specific structure, and said continuous circuits are further connected by the carbon fiber to form a dense conductive net work.

In addition, the composition has characteristics that the glass fiber is uniformly dispersed in the composition with the carbon fiber, and particularly in the molding material molded under a high shearing rate such as injection molding, these fiber components are dispersed substantially without any directional property which is quite different from common sense.

The composition of the present invention can accomplish various effects that it is excellent in conductivity and dimensional accuracy, and also excellent in stability of these properties against circumferential temperature change, mechanical strength and oil resistance, by controlling dispersion of specific conductive fillers and fibrous fillers for reinforcement uniformly and selectively without any directional property.

The composition of the present invention thus obtained can be realized to practically use for a field of replacing metal parts with a plastic material which could not be accomplished by the conventional thermoplastic resin.

EXAMPLES 1 to 11

After mixing a polycarbonate, a high density polyethylene (density: 0.950, MFR: 5.2 g/10 min), a glass fiber having an average diameter of 10 μm and an average length of 1.5 mm, a carbon fiber (PAN method) having an average diameter of 9 μm and an average length of 6 mm, Oil Furnace carbon black (produced by Aczo Co., "Ketchen Black EC" (trade name)) having a specific surface area of 900 m²/g and a melamine·cyanuric acid adduct with ratios as shown in Table 1, the mixture was pelletized by a twin-screw extruder. From the resulting pellets, a test piece was molded by using a screw in-line type injection molding machine, and various physical properties were tested and evaluated. The results are shown in Table 1.

Here, preparation of the melamine·cyanuric acid adduct was carried out as shown below.

Preparation of the melamine·cyanuric acid addut

In a four-necked flask equipped with a cooling tube and a stirrer were charged 9.82 g of melamine, 100.6 g (molar ratio of 1:1) of isocyanuric acid and 28.5 g of a polycarbonate, and then a mixed solvent comprising 2000 g of tetrafluorofuran and 222 g of water was added, heating was started while stirring. After inner temperature was reached to 62° C. for about one hour, ripening was carried out at the same temperature for one hour and 30 minutes to complete the reaction. Subsequently, the solvent was removed by filtration, the filtrate was dried at 50° C. for 5 hours under reduced pressure, and crushed to obtain a melamine·cyanuric acid adduct which was surface treated with the polycarbonate.

Also, in the above reaction, the reaction was similarly carried out except for removing a polycarbonate and tetrafluorofuran, a surface untreated melamine·cyanuric acid adduct was obtained.

Evaluation test methods are as shown below.

(1) Volume specific resistance
Measured according to SRIS2301 according to Nippon Rubber Association.

(2) Surface resistance
Measured by a Loresta surface resistor manufactured by Mitsubishi Petrochemical Co. Ltd.

(3) Izod impact strength
Measured according to ASTM D256.

(4) Bending strength
Measured according to ASTM D790.

(5) Oil resistance
A test piece (20 mm long, 40 mm width and 1.8 mm thickness) shown in FIG. 1 was molded by injection molding and after dropping an oil "Diamond R032" (trade name) in a hole of its projection a (4 mm outer diameter, 1.477 mm inner diameter and 2.5 mm height), a pin having a diameter of 1.48 mm was pressed into the hole and the test piece was allowed to stand in an oven at 80° C. for 24 hours to evaluate the presence or absence of occurrence of crack at the projection portion.

Figure 2:
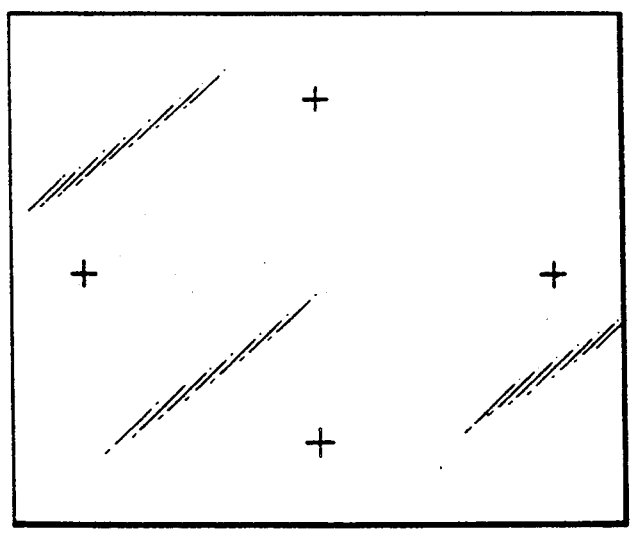
FIG. 2 is a plan view of a test piece for evaluation of mold shrinkage ratio.

(6) Dimensional accuracy
A test piece (80 mm long, 120 mm width and 2 mm thickness) shown in FIG. 2 was prepared by injection molding, and after it was allowed at a predetermined temperature for 24 hours, a shrunk ratio between mold dimension marks (+ marks) on one surface of the test piece at the flow direction of the resin (longitudinal direction) was measured.

(7) Moldability
An injection molding pressure when producing a test piece shown in FIG. 2 was measured.

Comparative examples 1 to 4

Compositions were prepared in the same manner as in above Examples and the same evaluations were carried out.

The results are shown in Table 1.

TABLE 1

| | | | Example | | | | Comparative Example | | | |
|---|---|---|---|---|---|---|---|---|---|---|
| | | | 1 | 2 | 3 | 4 | 1 | 2 | 3 | 4 |
| Formulation (parts by weight) | (a) | Polycarbonate | 60 | 44 | 65 | 70 | 88 | 80 | 60 | 72 |
| | (b) | High density polyethylene | 10 | 15 | 8 | 2 | — | 8 | 10 | — |
| | (c) | Glass fiber | 12 | 20 | 10 | 6 | — | — | 20 | 10 |
| | (d) | Carbon fiber | 8 | 18 | 5 | 16 | — | — | — | 8 |
| | (e) | Ketchen Black | 10 | 3 | 12 | 6 | 12 | 12 | 10 | 10 |
| | (f) | Melamine·cyanuric acid adduct | — | — | — | — | — | — | — | — |
| | (g) | Melamine·cyanuric acid adduct treated by polycarbonate | — | — | — | — | — | — | — | — |
| Evaluated result | Conductivity | Volume specific resistance $\Omega \cdot cm$ | 23° C. | 10 | $10^2$ | 10 | $10^2$ | $>10^6$ | $10^3$ | $10^3$ | $10^4$ |
| | | | 80° C. | 10 | $10^2$ | 10 | $10^2$ | — | — | — | — |
| | | Surface resistance $\Omega$ | 23° C. | 10 | 10 | $10^2$ | $10^2$ | $>10^6$ | $>10^6$ | $10^6$ | $10^4$ |
| | | | 80° C. | 10 | 10 | $10^2$ | $10^2$ | — | — | — | — |
| | Izod impact resistance kg · cm/cm$^2$ | | 12 | 11 | 11 | 14 | 8 | 10 | 7 | 8 |
| | Bending strength kg/cm$^2$ | | 1,800 | 2,100 | 1,600 | 1,900 | 850 | 780 | 1,400 | 1,700 |
| | Oil resistance: Crack | | None | None | None | None | Present | None | None | Present |
| | Mold shrunk ratio (%) | 23° C. | 2.7 | 2.0 | 3.0 | 2.4 | 7.3 | 7.6 | — | — |
| | | 80° C. | 2.8 | 2.0 | 3.1 | 2.4 | 7.6 | 8.4 | — | — |
| | Injection molding pressure kg/cm$^2$ | | — | — | — | — | — | — | — | — |

| | | | Example | | | | | | |
|---|---|---|---|---|---|---|---|---|---|
| | | | 5 | 6 | 7 | 8 | 9 | 10 | 11 |
| Formulation (parts by weight) | (a) | Polycarbonate | 65 | 65 | 47 | 67 | 62 | 62 | 47 |
| | (b) | High density polyethylene | 6 | 4 | 12 | 4 | 9 | 9 | 12 |
| | (c) | Glass fiber | 9 | 12 | 20 | 11 | 11 | 11 | 20 |
| | (d) | Carbon fiber | 8 | 10 | 18 | 11 | 7 | 7 | 18 |
| | (e) | Ketchen Black | 12 | 9 | 3 | 7 | 11 | 11 | 3 |
| | (f) | Melamine·cyanuric acid adduct | — | — | — | 0.01 | 1.5 | — | 5 |
| | (g) | Melamine·cyanuric acid adduct treated by polycarbonate | — | — | — | — | — | 1.5 | — |
| Evaluated | Conductivity | Volume specific | 23° C. | 10 | 10 | $10^2$ | 10 | 10 | 10 | $10^2$ |
| | | | 80° C. | 10 | 10 | $10^2$ | 10 | 10 | 10 | $10^2$ |

TABLE 1-continued

| result | tiv-ity | resistance Ω·cm | | | | | | | | |
|---|---|---|---|---|---|---|---|---|---|---|
| | | Surface resistance Ω | 23° C. | 10 | 10 | 10 | 10 | 10 | 10 | 10 |
| | | | 80° C. | 10 | 10 | 10 | 10 | 10 | 10 | 10 |
| | Izod impact resistance kg·cm/cm² | | | 10 | 11 | 12 | 11 | 10 | 13 | 10 |
| | Bending strength kg/cm² | | | 1,600 | 1,900 | 2,100 | 1,800 | 1,700 | 1,700 | 2,200 |
| | Oil resistance: Crack | | | None | None | None | None | None | None | None |
| | Mold shrunk ratio (%) | | 23° C. | 3.0 | 2.6 | 1.9 | 2.3 | 2.8 | 2.8 | 1.9 |
| | | | 80° C. | 3.0 | 2.6 | 1.9 | 2.4 | 2.9 | 2.9 | 1.9 |
| | Injection molding pressure kg/cm² | | | 1,200 | 1,100 | 1,000 | 700 | 500 | 500 | 520 |

We claim:

1. A conductive thermoplastic resin composition which comprises
   (a) 30 to 86% by weight of a thermoplastic aromatic polycarbonate,
   (b) 2 to 15% by weight of a high density polyethylene having a density of 0.945 to 0.970 g/cm³ and a melt flow rate of 0.1 to 30 g/10 min,
   (c) 5 to 20% by weight of a glass fiber having an average diameter of 3 to 15 μm and an average length of 0.05 to 10 mm,
   (d) 5 to 20% by weight of a carbon fiber having an average diameter of 3 to 20 μm and an average length of 0.03 to 15 mm, and
   (e) 2 to 15% by weight of a conductive carbon black which is oil furnace black.

2. The resin composition according to claim 1, wherein said high density polyethylene has a density of 0.950 g/cm³ or higher.

3. The resin composition according to claim 1, wherein said high density polyethylene has a melt flow rate of 0.5 to 15 g/10 min.

4. The resin composition according to claim 1, wherein said glass fiber has an average diameter of 5 to 12 μm and an average length of 0.1 to 6 mm.

5. The resin composition according to claim 1, wherein said carbon fiber has an average diameter of 3 to 10 μm and an average length of 0.5 to 10 mm.

6. The resin composition according to claim 1, wherein said oil furnace black is at least one selected from the group consisting of Extra Conductive Furnace Black, Super Conductive Furnace Black, Conductive Furnace Black and Super Abrasion Furnace Black.

7. The resin composition according to claim 1, wherein said carbon black has a BET type specific surface area of 850 m²/g or more.

8. The resin composition according to claim 1, wherein said composition further contains a melamine-cyanuric acid adduct.

9. The resin composition according to claim 8, wherein said melamine-cyanuric acid adduct has an average particle size of 0.1 to 50 μm.

10. The resin composition according to claim 8, wherein an amount of said melamine-cyanuric acid adduct is 0.01 to 5 parts by weight based on 100 parts by weight of the sum of Components (a) to (e).

11. The resin composition according to claim 8, wherein said melamine-cyanuric acid adduct is a melamine-cyanuric acid adduct or a melamine-isocyanuric acid adduct.

* * * * *